(12) United States Patent
Dimicelli

(10) Patent No.: US 8,834,611 B1
(45) Date of Patent: Sep. 16, 2014

(54) METHOD FOR FILTERING AIR

(71) Applicant: Anthony Nicholas Dimicelli, Houston, TX (US)

(72) Inventor: Anthony Nicholas Dimicelli, Houston, TX (US)

(*) Notice: Subject to any disclaimer, the term of this patent is extended or adjusted under 35 U.S.C. 154(b) by 0 days.

(21) Appl. No.: 14/226,707

(22) Filed: Mar. 26, 2014

(51) Int. Cl.
*B01D 46/00* (2006.01)
*B01D 46/52* (2006.01)

(52) U.S. Cl.
CPC .......... *B01D 46/521* (2013.01); *B01D 46/0032* (2013.01); *B01D 46/0028* (2013.01); *B01D 46/0036* (2013.01); *B01D 2265/02* (2013.01); *B01D 46/002* (2013.01); *B01D 46/0013* (2013.01); *B01D 2267/30* (2013.01); *Y10S 55/05* (2013.01); *Y10S 55/31* (2013.01)
USPC .................. 95/286; 95/273; 55/483; 55/484; 55/497; 55/499; 55/501; 55/502; 55/DIG. 5; 55/DIG. 31

(58) Field of Classification Search
CPC .. B01D 46/0013; B01D 46/002; B01D 46/10; B01D 46/12; B01D 2265/02; B01D 2265/024
USPC ............ 95/273, 286; 55/483, 484, 497, 499, 55/501, 502, DIG. 5, DIG. 31
See application file for complete search history.

(56) References Cited

U.S. PATENT DOCUMENTS

| | | |
|---|---|---|
| 5,782,944 A | 7/1998 | Justice |
| 7,320,720 B2 | 1/2008 | Ticknor |
| 8,241,381 B2 | 8/2012 | Braunecker et al. |
| 8,398,752 B2 | 3/2013 | Brownstein et al. |
| 8,491,690 B2 | 7/2013 | Crabtree et al. |
| 2007/0084167 A1 | 4/2007 | Ticknor |
| 2012/0318147 A1 | 12/2012 | Gates et al. |

*Primary Examiner* — Robert Clemente
(74) *Attorney, Agent, or Firm* — Buskop Law Group, PC; Wendy Buskop

(57) ABSTRACT

A method for air filtration having a plurality of interlocking filters for use in an HVAC system or in other air filtration systems. Each interlocking filter can have a pleated filter media, a first frame, a second frame for supporting the first frame, an adhesive to connecting the pleated filter media to the first frame and the first frame to the second frame, and a one piece non-rigid flexible integral locking mechanism for connecting together the interlocking filters without clips or glue in a quick connect and quick disconnect manner.

20 Claims, 11 Drawing Sheets

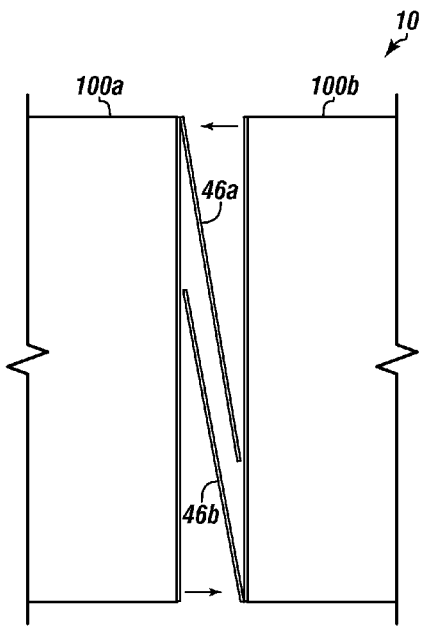
FIGURE 5A
FIGURE 5B
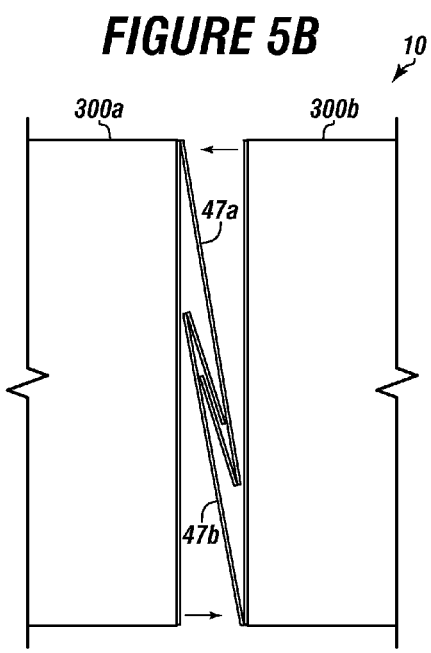
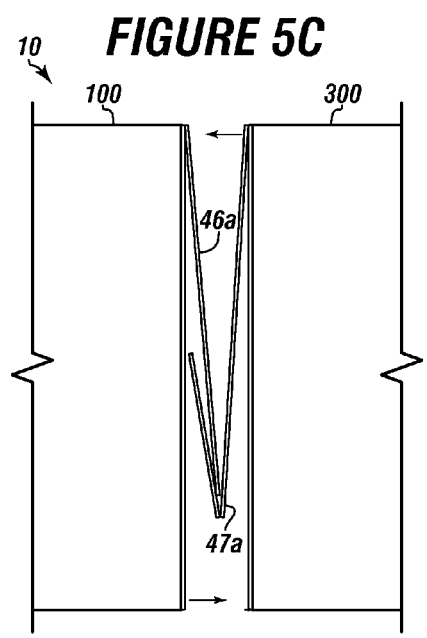
FIGURE 5C

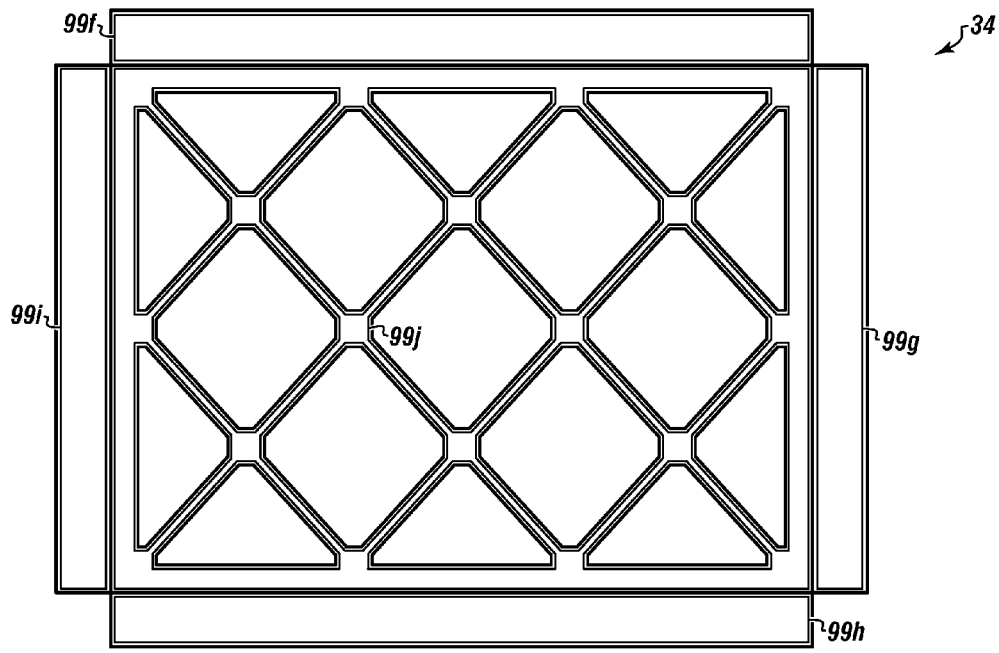
*FIGURE 6A*
*FIGURE 6B*
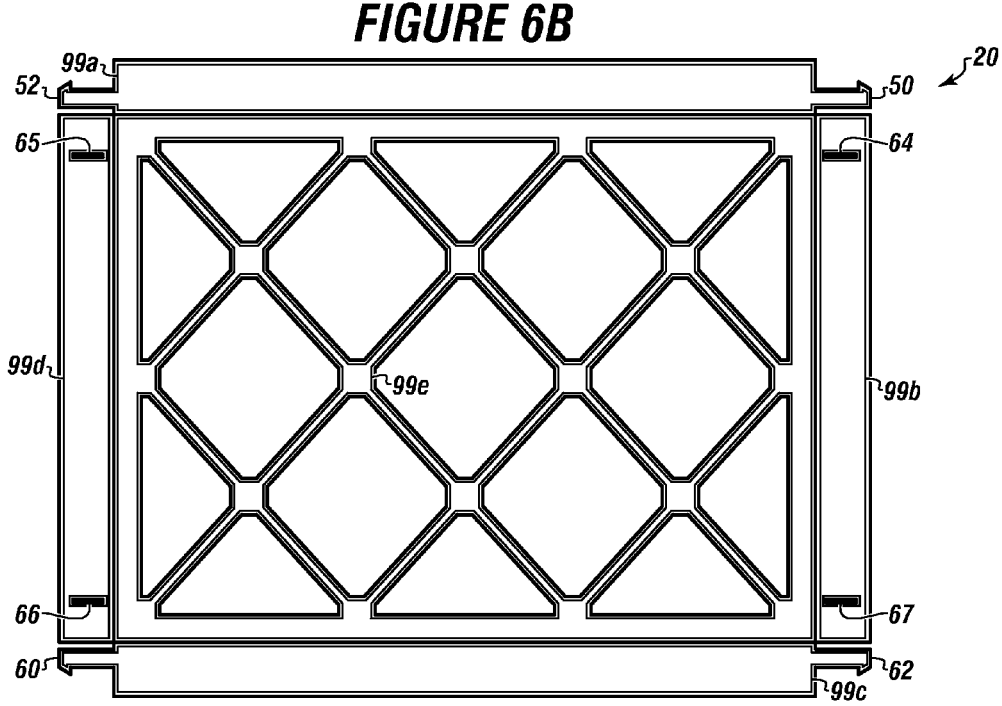

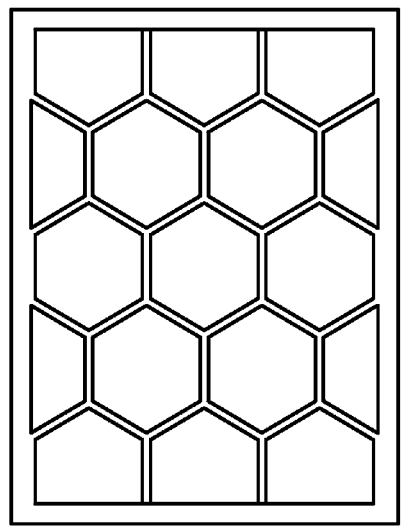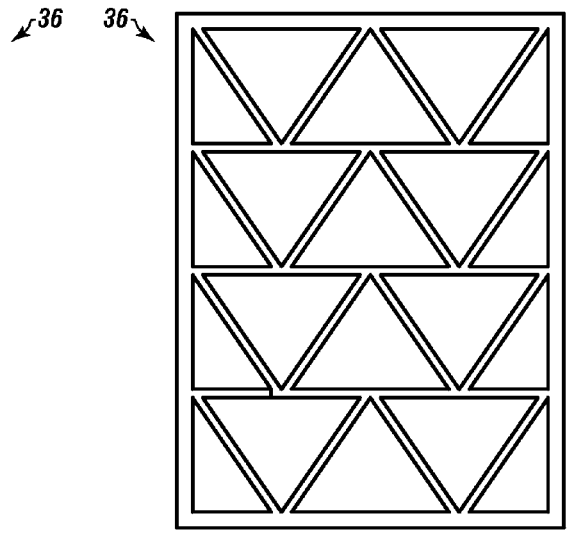
FIGURE 7A  FIGURE 7B
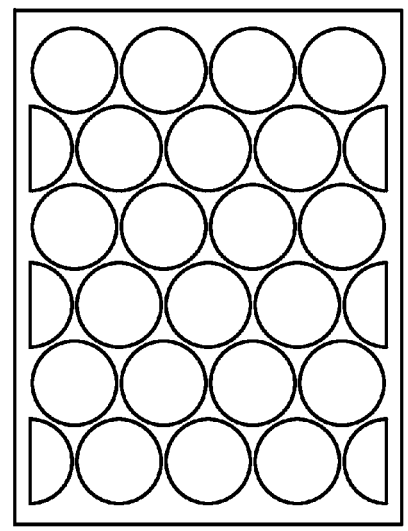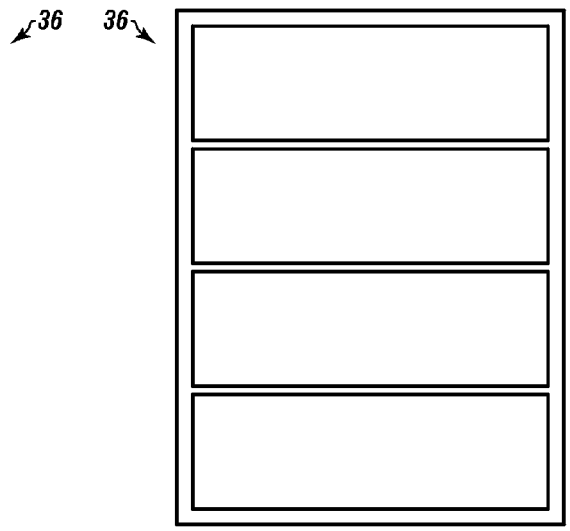
FIGURE 7C  FIGURE 7D

FIGURE 7E
FIGURE 7F
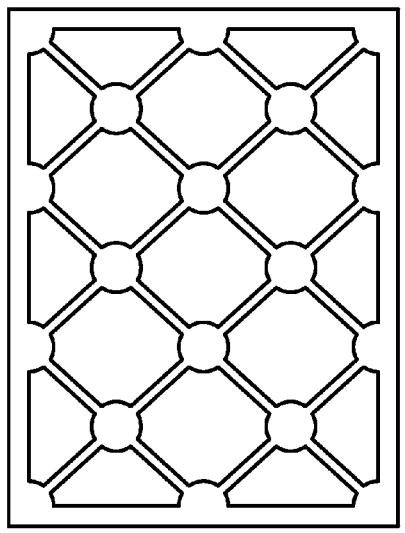
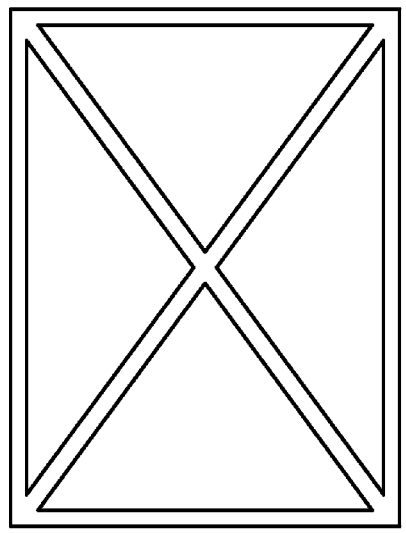

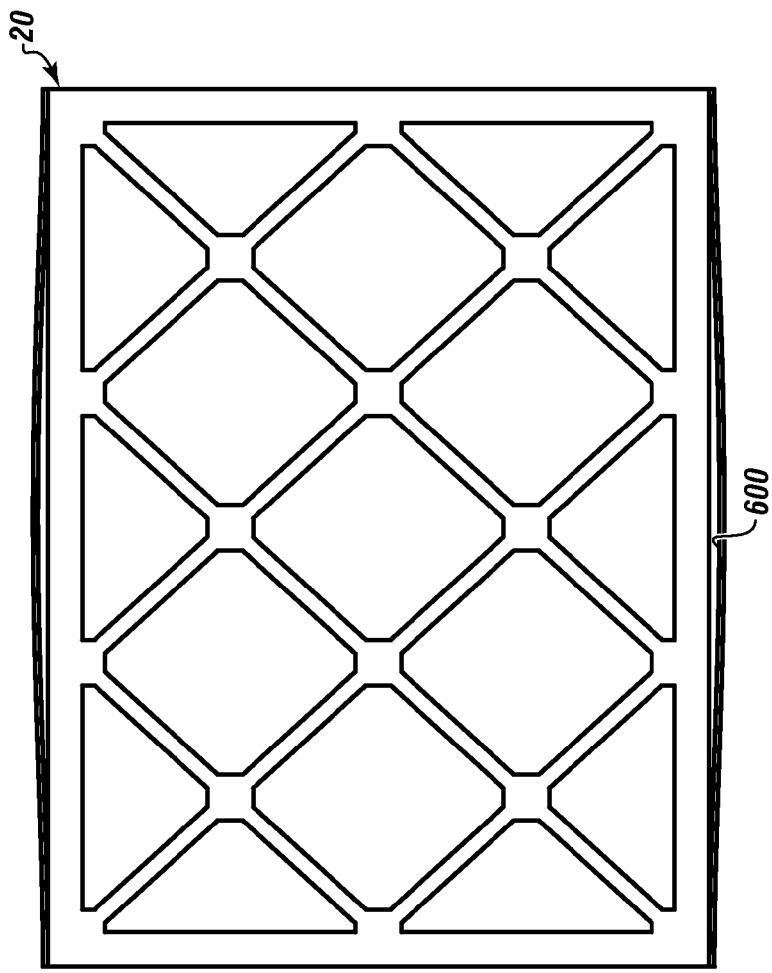

FIGURE 9

| | |
|---|---|
| PLEATING A FILTER MEDIA | 900 |
| CREATING A FIRST FRAME | 902 |
| LAYING THE FIRST FRAME FLAT, ADHERING THE PLEATED FILTER MEDIA TO THE FIRST FRAME FIRST SIDE AND THE FIRST FRAME SECOND SIDE, AND ADHERING THE CORRUGATED EDGES OF THE PLEATED FILTER MEDIA TO THE FIRST FRAME THIRD SIDE AND THE FIRST FRAME FOURTH SIDE | 904 |
| CREATING A SECOND FRAME | 906 |
| APPLYING AN ADHESIVE TO THE SIDES OF THE FIRST FRAME TO CONNECT THE SIDES OF THE SECOND FRAME WITH THE SIDES OF THE FIRST FRAME | 908 |
| APPLYING AN ADHESIVE TO THE PLEATED FILTER MEDIA WITHIN THE FIRST FRAME FRONT PANEL AND THE SECOND FRAME FRONT PANEL TO HOLD THE PLEATED FILTER MEDIA WITHIN THE FIRST FRAME | 910 |
| FORMING TABS AND SLOTS AND USING THE TABS TO ENGAGE THE SLOTS TO HOLD THE SECOND FRAME AROUND THE FIRST FRAME FORMING AT LEAST ONE INTERLOCKING FILTER | 912 |
| USING THE NOW FORMED INTERLOCKING FILTER TO INTERLOCK THE NON-ADHESIVE SINGLE PROJECTION PORTION OR A NON-ADHESIVE DOUBLE PROJECTION PORTION FROM A SECOND FRAME FRONT PANEL OF A FIRST INTERLOCKING FILTER TO ANOTHER INTERLOCKING FILTER TO ENGAGE A NON-ADHESIVE SINGLE PROJECTION PORTION OR A NON-ADHESIVE DOUBLE PROJECTION PORTION FROM A SECOND FRAME FRONT PANEL OF THE ONE PIECE NON-RIGID FLEXIBLE INTEGRAL LOCKING MECHANISM OF A SECOND INTERLOCKING FILTER | 914 |
| FORMING A "J" SHAPE IN THE TIGHT ENGAGEMENT BETWEEN THE INTERLOCKING FILTERS, PROVIDING A SECURE FILTRATION SYSTEM RESISTANT TO IMPACT, RESISTANT TO COMING APART WHEN HVAC SYSTEMS START UP, BLOWING AIR AT A HIGHER VELOCITY THAN WHEN RUNNING | 916 |
| FORMING AN AIR TIGHT CONNECTION AND FILTERING AT LEAST 95 PERCENT OF THE AIR PASSING THROUGH THE FIRST INTERLOCKING FILTER WHILE SIMULTANEOUSLY CREATING THE NON-DEFORMING PARTICULATE FILTRATION BANK OF THE PLURALITY OF INTERLOCKING FILTERS WITHOUT CLAMPS OR ADHESIVE TO HOLD THE INTERLOCKING FILTERS TO EACH OTHER | 918 |

METHOD FOR FILTERING AIR

FIELD

The present embodiments generally relate to a method for filtering air using a non-deforming particulate filtration bank for uni-directional air filtration, wherein the non-deforming particulate filtration bank uses a plurality of interlocking filters.

BACKGROUND

A need exists for a method to quickly assemble interlocking filters and form a non-deforming particulate filtration bank of filters through which air only passes through filter media, that is adaptable in the field to various sizes and shapes, and provides 95 percent particulate filtration when formed as the non-deforming particulate filtration bank.

A need exists for method to create a non-deforming particulate filtration bank that provides extra support between filters that are used in heating, ventilation and air conditioning systems.

A further need exists for a method to preventing bypass of airflow between connected filters that damages secondary filters, tertiary filters, and heating, ventilation, air conditioning equipment.

A need exists for a method that takes less time to custom fit filters into spaces in heating, ventilation, air conditioning equipment for quick connect and quick disconnect.

The present embodiments meet these needs.

BRIEF DESCRIPTION OF THE DRAWINGS

The detailed description will be better understood in conjunction with the accompanying drawings as follows:

FIG. 5A shows a pair of interlocking filters, each interlocking filter having a one piece non-rigid flexible integral locking mechanism with a non-adhesive single projection portion created by the method.

FIG. 5B shows a pair of interlocking filters, each interlocking filter having a one piece non-rigid flexible integral locking mechanism with a double projection portion created by the method.

FIG. 5C shows a pair of interlocking filters, the first interlocking filter having a non-adhesive single projection portion and the second interlocking filter having a non-adhesive double projection portion created by the method.

FIG. 6A depicts a bottom view of a second frame before assembly into an interlocking filter created by the method.

FIG. 6B depicts a bottom view of a first frame before assembly into an interlocking filter created by the method.

FIGS. 7A-7F show different embodiments of the first and second frame front panels created by the method.

FIGS. 8A and 8B show an interlocking filter with a locking pocket created by the method.

FIG. 9 depict the steps of the method according to one or more embodiments.

Figure 1:
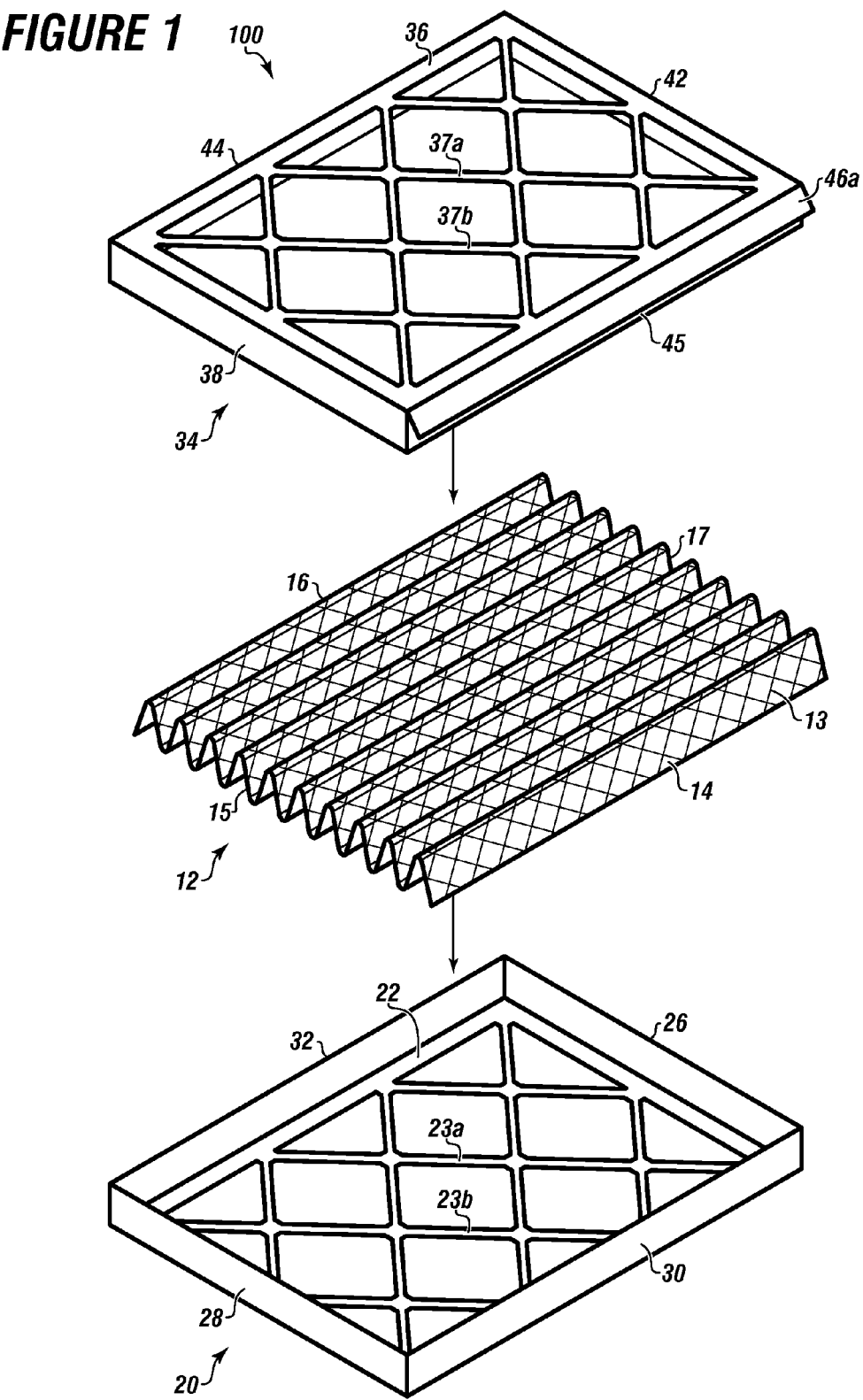
FIG. 1 is a top exploded view of an interlocking filter with a one piece non-rigid flexible integral locking mechanism having a non-adhesive single projection portion created by the method.

The present embodiments are detailed below with reference to the listed Figures.

DETAILED DESCRIPTION OF THE EMBODIMENTS

Before explaining the present method in detail, it is to be understood that the method is not limited to the particular embodiments and that it can be practiced or carried out in various ways.

The embodiments relate to a method for filtering air by creating a non-deforming particulate filtration bank for one direction filtration of air.

The method connects together a plurality of interlocking filters for use in a heating, ventilation and air conditioning system or other similar single direction air filtration systems.

The invention creates versatile filters which can remove the filter media and insert a new filter media.

The invention creates a non-deforming particulate filter bank that can vary in size and which is particularly useful in hospitals and other institutions that require at least 95 percent particulate filtration and which have varying sizes of ducts and a need for fast in the field versatility for assembling the filter bank.

Each interlocking filter of the non-deforming particulate filtration bank can have a pleated filter media, which can have an antimicrobial coating, a carbon coating, or an expanded mesh formed thereon.

In embodiments, the pleated filter media can be a one piece media. In embodiments, the pleated filter media can be an electrostatic filter media that is made of synthetic or cotton blend. In other embodiments, the pleated filter media can be a heat treated media.

In embodiments, the pleated filter media can comprise from 4 pleats per foot to 30 pleats per foot, and up to 500 pleats per foot if micropleates are used.

Each interlocking filter can have a first frame and a second frame for supporting the pleated filter media in the first frame.

In embodiments of the method, to connect the two frames together and to ensure the pleated filter media receives all the air flow, an adhesive can be used to connect the pleated filter media to a first frame front panel and a second frame front panel.

An adhesive can be used to connect the first frame to the second frame to create the interlocking filter. In embodiments, the interlocking filters can be quick connect and quick disconnect interlocking filters.

In embodiments, the first frame and the second frame can be identical shapes, such as rectangles, squares, and circles or another custom shape, such as for airplanes or boats.

In embodiments, the second frame of each interlocking filter can have a one piece non-rigid flexible integral locking mechanism for connecting a pair of interlocking filters together without the need of clips or glue in a quick connect and quick disconnect manner.

The method creates a one piece non-rigid flexible integral locking mechanism, which can be connected to the second frame front panel between a second frame first side and a second frame second side.

A non-adhesive single projection portion of the one piece non-rigid flexible integral locking mechanism can extend outwardly from the second frame front panel. A hinged potion can move along the edge of the second frame front panel. The non-adhesive single projection portion of the one piece non-rigid flexible integral locking mechanism can either have a first width portion or a double width portion.

The embodiments further relate to a method for installing a plurality of interlocking filters creating an air filtration bank by creating a first interlocking filter and a second interlocking filter and connecting the first interlocking filter to the second interlocking filter using no adhesive or glues.

According to the method, the first interlocking filter and the second interlocking filter can be connected together with a non-adhesive single projection of the first interlocking filter to a non-adhesive second projection of a second interlocking filter.

In another embodiment of the method, a non-adhesive single projection of a first interlocking filter can engage a non-adhesive double projection of a second interlocking filter.

In still another embodiment of the method, a non-adhesive single projection of a first interlocking filter engages a non-adhesive double projection of a second interlocking filter.

The embodiments of the invention can allow a user to better comply with environmental stands for Leadership in Energy and Environmental Design (LEED) buildings.

The filtration system of the method saves expense on maintenance for heating, ventilation, and air conditioning (HVAC) equipment.

The method creates a non-deforming particulate filtration bank that stops viruses and bacteria and allows gases to escape by using pleated filter media that can have from 1 pleat to 500 pleats per square foot.

In embodiments, the method creates individual interlocking filters that can be from ⅜ of an inch to 16 inches deep, 1 foot to 5 feet across, and 1 foot to 6 feet long.

In embodiments, the method creates frames of the filtration system that can be made from paper, cardboard, plastic, metal, styrene foam or polymeric clay.

In embodiments the method uses filter media that can be microfiber glass, cotton polymer blends, synthetic non-woven materials, non-woven cellulose, non-woven polypropylene, or similar materials.

For square versions of the fibers, the squares can be 2 feet by 2 feet with a thickness from $\sqrt[3]{8}^{th}$ of an inch to 16 inches.

In embodiments, the method applies a coating on the frames. In embodiments, the coating can be paint. In other embodiments, the coating can be an antimicrobial coating on the pleated filter media, which can be made by Aegis.

In embodiments the frames can be formed from die cut paper.

Turning now to the Figures, FIG. 1 is a top exploded view of an interlocking filter with a one piece non-rigid flexible integral locking mechanism having a non-adhesive single projection portion created by the method.

The method creates three main components to form the quick connect and quick disconnect interlocking filter 100.

The three components include (i) a pleated filter media 12, (ii) a first frame 20 for holding the pleated filter media 12 providing support around the pleated filter media, and (iii) a second frame 34 not only surrounding the first frame 20, providing non-deforming support, but also providing a one piece non-rigid flexible integral locking mechanism 45 connected to the second frame front panel 36 between the second frame first side 38 and second frame second side 42.

A non-adhesive single projection portion 46a of the one piece non-rigid flexible integral locking mechanism 45 can extend outwardly from the second frame front panel 36. In this embodiment, the portion can have a width, such as from 1 inch to 3 inches. In other embodiments the portion can have a double width, such as 4 inches to 10.

The interlocking filter 100 can have a pleated filter media 12 with a first edge 14 and a second edge 16 opposite the first edge.

The pleated filter media 12 can have a first corrugated edge 15 and a second corrugated edge 17 opposite the first corrugated edge.

In this Figure, the pleated filter media 12 is shown with an expanded mesh 13.

In embodiments, it should be noted that each of the first and second edges of the pleated filter media can be connected to opposing first frame sides with and adhesive.

Additionally, each of the corrugated edges of the pleated filter media can be connected to opposing first frame sides which do not engage the first and seconds edges with an adhesive.

In embodiments, the expandable mesh 13 can be aluminum, welded metal wire, semi-rigid polymer webbing, and combinations thereof. In other embodiments, the expandable mesh 13 can be laminated to the pleated filter media with an adhesive.

The interlocking filter 100 is shown with the first frame 20 with a first frame front panel 22 with a plurality of first front support members 23a and 23b extending from opposing sides of the first frame front panel 22.

In embodiments, the first frame can be rectangular.

In embodiments, the plurality of first front support members 23a and 23b can be made from the same material as the first frame 20. In other embodiments, the plurality of first front support members can be made from a different material then the first frame.

In embodiments, the plurality of first front support members cover less than 10 percent of the total surface area of the pleated filter media.

The first frame 20 has a first frame first side 26 connected to the first frame front panel 22. The first frame 20 has a first frame second side 28 connected to the first frame front panel 22 opposite the first frame first side 26.

The first frame 20 has a first frame third side 30 connected to the first frame front panel 22. The first frame third side is between the first frame first side 26 and the first frame second side 28.

The first frame 20 has a first frame fourth side 32 connected to the first frame front panel 22. The first frame fourth side is between the first frame first side 26 and the first frame second side 28.

Second frame 34 has a second frame front panel 36 with a plurality of second front support members 37a and 37b extending from opposing sides of the second frame front panel 36.

In embodiments, the plurality of second front support members 37a and 37b can be made from the same material as the second frame 34. In other embodiments, the plurality of second front support members can be made from a different material then the second frame.

In embodiments, the plurality of second front support members cover less than 10 percent of the total surface area of the pleated filter media and assist in containing the pleated filter media within the second frame.

The second frame 34 has a second frame third side 44 connected to the second frame front panel 36. The second frame third side is between the second frame first side 38 and the second frame second side 42.

In embodiments, an adhesive can be used to hold the sides of the first frame to the sides of the second frame and hold the pleated filter media within the first frame front panel and the second frame front panel.

In embodiments the adhesive can be paper glue, rubber cement, paste made from flour, water and salt, hot glue, tape, contact cement, or a similar adhesive can be used.

The interlocking filter 100 has a one piece non-rigid flexible integral locking mechanism 45 for engaging another interlocking filter using a non-adhesive single projection portion 46a.

The one piece non-rigid flexible integral locking mechanism 45 with non-adhesive single projection portion 46a can extend the length of the first frame or the second frame. In embodiments, the non-adhesive single projection can be flat.

The one piece non-rigid flexible integral locking mechanism with non-adhesive single projection can be attached to the first frame or the second frame at a position where at least one of the first frame sides or at least one of the second frame sides meet the first frame front panel or the second frame front panel respectively.

The one piece non-rigid flexible integral locking mechanism with non-adhesive single projection portion can extend outward from the first frame or the second frame at a distance from ½ of an inch to 3 inches.

In embodiments, the one piece non-rigid flexible integral locking mechanism can be a discontinuous one piece non-rigid flexible integral locking mechanism, such that the non-adhesive single projection portion can extend from one side for 3 inches, then there is no one piece non-rigid flexible integral locking mechanism and then there is 3 more inches of the non-adhesive single projection portion extending from the side.

In embodiments the non-adhesive single projection portion can be from 1/16 of an inch to 1 inch in thickness.

In embodiments, the one piece non-rigid flexible integral locking mechanism can be made from the same material as the first frame or second frame. In other embodiments, the one piece non-rigid flexible integral locking mechanism can be made from a different material then the first frame or the second frame.

The one piece non-rigid flexible integral locking mechanism is designed to move, in a hinge like motion, projecting from the side of the first frame or the second frame to create the glue-less engagement with another filter, in a flush fit.

In embodiments, the non-adhesive single projection portion can be 1 inch wide, 12 inches long and $1/8^{th}$ of an inch in thickness and can be made from cardboard or a light weight sheet of polymer that is movably hinged to the frame.

Figure 2:
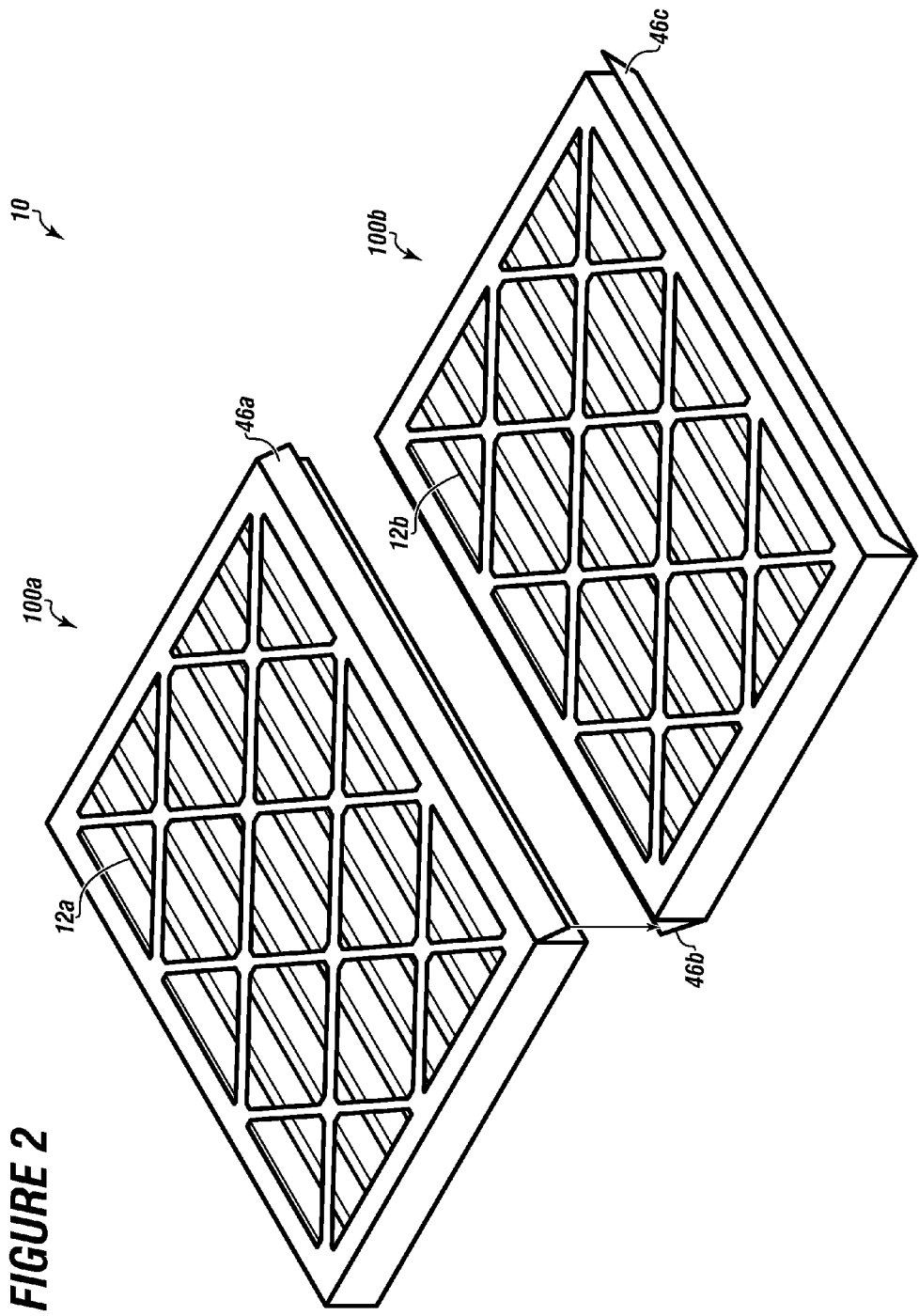
FIG. 2 depicts a pair of interlocking filters, each interlocking filter having a non-adhesive single projection portion on opposite sides for forming the complimentary engagement while also showing the pleated filter media without expanded mesh bonded thereon created by the method.

FIG. 2 depicts a pair of interlocking filters, each interlocking filter having a non-adhesive single projection portion on opposite sides for forming the complimentary engagement while also showing the pleated filter media without expanded mesh bonded thereon created by the method.

The non-adhesive single projection portion 46a of the first single projection interlocking filter 100a engages the non-adhesive single projection portion 46b of the second single projection interlocking filter 100b. A non-adhesive single projection portion 46c for attaching additional interlocking filters is also shown.

The pluralities of interlocking filters make up the non-deforming particulate filtration bank 10.

The non-deforming filtration bank has a plurality of interlocking filters held together without clamps or adhesive yet simultaneously (i) adding strength at the engaged locking mechanisms while (ii) minimizing a separation distance between each frame of each filter to less than 0.25 inches enabling (iii) a single direction of air flow filtration exclusively through the pleated filter media usable in medical facilities and other facilities requiring a 95 percent capture rates for airborne contaminates.

Pleated filter media 12a and 12b is depicted within each pair of first and second frames of each single projection interlocking filters without having the expanded mesh.

Figure 3:
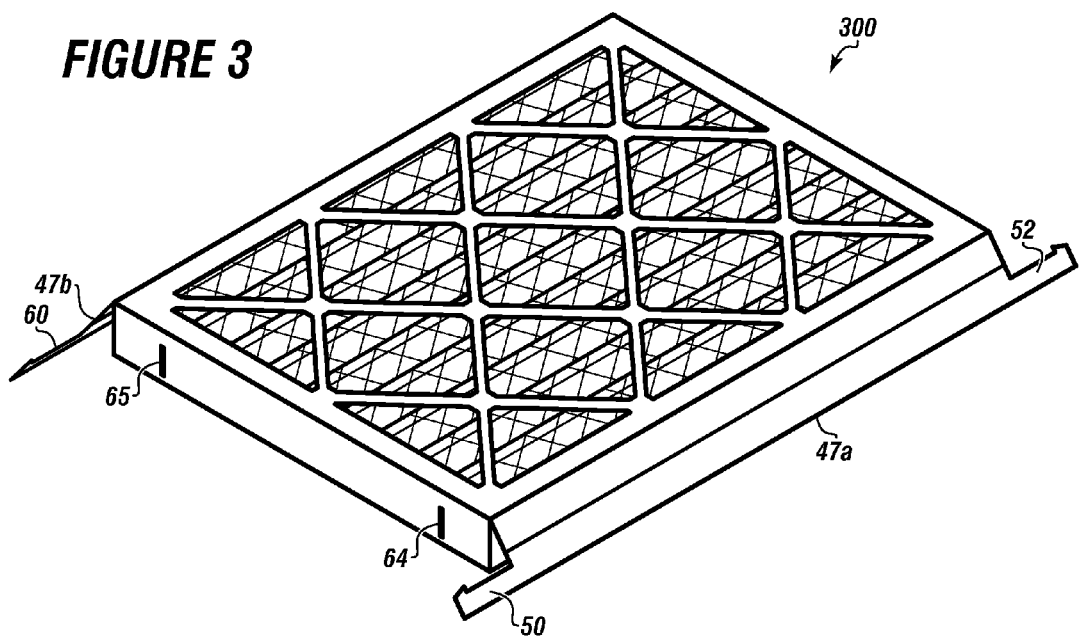
FIG. 3 is a top view of an interlocking filter with two one piece non-rigid flexible integral locking mechanisms, each one piece non-rigid flexible integral locking mechanism having a non-adhesive double projection portion and a pair of tabs for engaging slots created by the method.

FIG. 3 is a top view of an interlocking filter with two one piece non-rigid flexible integral locking mechanisms, each one piece non-rigid flexible integral locking mechanism having a non-adhesive double projection portion and a pair of tabs for engaging slots created by the method.

A double projection interlocking filter 300 is shown with a one piece non-rigid flexible integral locking mechanism having a non-adhesive double projection portion 47a extending from the second frame front panel having a pair of tabs 50 and 52 for engaging slots.

Tab 50 engages slot 64. Tab 52 engages another slot not viewable in this Figure. The double projection interlocking filter 300 has a second one piece non-rigid flexible integral locking mechanism having a second non-adhesive double projection portion 47b with a pair of tabs, however only tab 60 can be viewed. Tab 60 engages slot 65 forming the frame structure.

The non-adhesive double projection portion 47a can extend the length of the second frame of the double projection interlocking filter 300.

The non-adhesive double projection portion can extend outward from the second frame at a distance from ½ of an inch to 3 inches, and can have a fold or crease in the middle, forming a bend enabling the complementary engagement with another double projection portion to look like the letter "J".

The "J" shape creates a tight engagement between the plurality of interlocking filters, providing a secure filtration system resistant to impact, resistant to coming apart when HVAC systems start up, blowing air at a higher velocity than when running. The "J" shape also provides simultaneously a tight flush rigid mechanical fit between the frames of the two connected filters keeping the frames side by side in a rigid, engagement with a space between the filters of less than 0.25 inches.

The one piece non-rigid integral locking mechanisms inter-engage, forming an air tight connection, and filtering at least 95 percent of the air passing through the first and second interlocking filters while simultaneously creating a non-deforming particulate filtration bank.

In embodiments, the one piece non-rigid integral locking mechanism can be a discontinuous one piece non-rigid integral locking mechanism, such that a portion of the one piece non-rigid integral locking mechanism can extend down one edge of a frame for 3 inches, then further down the same frame on the same side have no one piece non-rigid integral locking mechanism and then still further down the same side of the same frame there is 3 more inches of the one piece non-rigid integral locking mechanisms.

In embodiments the one piece non-rigid integral locking mechanisms can have portions that extend from ⅛ of an inch to 2 inches away from the frame.

In embodiment the portions extending away from the frame can have identical thicknesses.

In embodiments, the one piece non-rigid integral locking mechanisms can be made from the same material as the second frame.

In other embodiments, one piece non-rigid integral locking mechanisms can be made from a different material then the first frame or the second frame.

In embodiments, the one piece non-rigid integral locking mechanisms can be made from cardboard with a fold extending longitudinally down the one piece non-rigid integral locking mechanisms parallel to the side of the frame.

The one piece non-rigid integral locking mechanisms are designed to move in a hinge like motion, to inter engage in a glue-less engagement.

In an embodiment, the one piece non-rigid integral locking mechanisms can have a projection portion that extends away from the frame as much as 3 inches and the one piece non-rigid integral locking mechanisms can have a length of 12 inches or at least 40 percent the length of the frame up to 100 percent the length of the frame.

In embodiments the one piece non-rigid integral locking mechanisms can have a thickness of ⅛ of an inch.

In embodiments, the one piece non-rigid integral locking mechanisms can be made from a light weight sheet of polymer.

Figure 4:
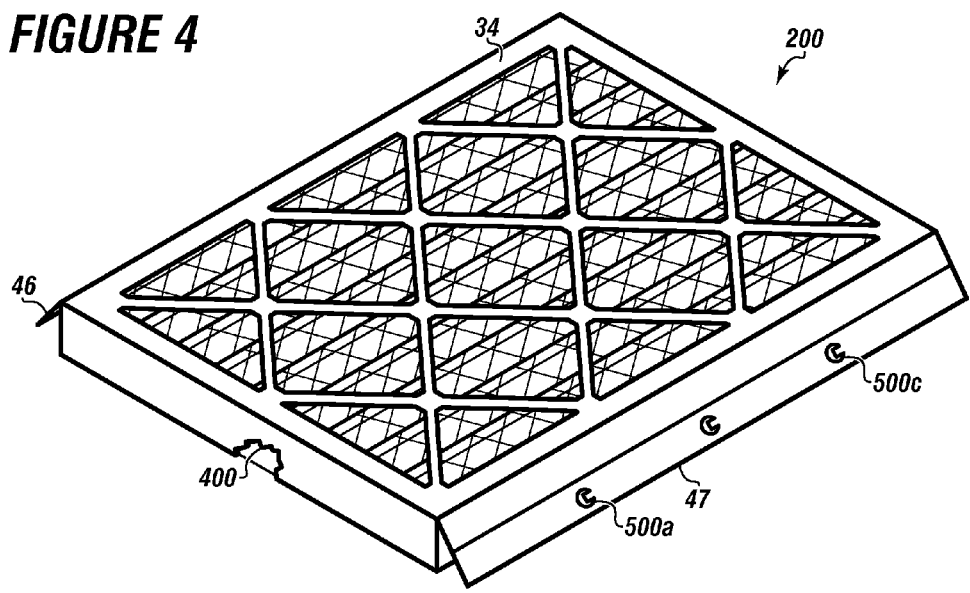
FIG. 4 is top view of an interlocking filter with a one piece non-rigid flexible integral locking mechanism having a non-adhesive double projection portion, and a one piece non-rigid flexible integral locking mechanism having a non-adhesive single projection portion created by the method.

FIG. 4 is top view of an interlocking filter 200 with a one piece non-rigid flexible integral locking mechanism having a non-adhesive double projection portion 47, and a one piece non-rigid flexible integral locking mechanism having a non-adhesive single projection portion 46 created by the method.

This Figure also shows a plurality of locking buttons 500a and 500c. The plurality of locking buttons can compressibly connect the non-adhesive double projection portion 44 to another interlocking filter.

In embodiments, the locking buttons 500a and 500c can connect a non-adhesive single projection portion from a first interlocking filter to another non-adhesive single projection portion of another interlocking filter or a non-adhesive double projection portion of a first interlocking filter to a non-adhesive double projection of a second interlocking filter.

Also shown is a coating 400 on the frame of the interlocking filter, which can be a waterproof coating.

FIG. 5A shows a pair of interlocking filters, each interlocking filter having a one piece non-rigid flexible integral locking mechanism with a non-adhesive single projection portion created by the method.

The first and second single projection interlocking filters 100a and 100b are shown forming a complimentary engagement of the non-adhesive single projection portions 46a and 46b creating the non-deforming particulate filtration bank 10.

The arrows in FIG. 5A show that the distance between the first and second single projection interlocking filters is to be minimized, and closed up when the projection portions engage each other, creating support to the non-deforming particulate filtration bank 10 using the one piece non-rigid integral locking mechanisms.

FIG. 5B shows a pair of interlocking filters, each interlocking filter having a one piece non-rigid flexible integral locking mechanism with two double projection portions created by the method.

The first and second double projection interlocking filters 300a and 300b are shown forming a complimentary engagement of the non-adhesive double projection portions 47a and 47b creating the non-deforming particulate filtration bank 10.

The arrows in FIG. 5B show that the distance between the first and second double projection interlocking filters is to be minimized, and closed up when the projection portions engage each other, creating physical structural support to prevent deformation to the non-deforming particulate filtration bank 10 using the one piece non-rigid integral locking mechanisms.

FIG. 5C shows a pair of interlocking filters, the first interlocking filter having a non-adhesive single projection portion and a second interlocking filter having a double projection portion created by the method.

This Figure shows the complementary engagement between a non-adhesive single projection portion 46a for a single projection interlocking filter 100 and a non-adhesive double projection portion 47a for a double projection interlocking filter 300.

The arrows in FIG. 5C show that the distance between the single projection interlocking filter 100 and the double projection interlocking filter 300 is to be minimized, and closed up when the projection portions engage each other, creating support to the non-deforming particulate filtration bank 10 using the one piece non-rigid integral locking mechanisms. The closing up also stops errant air flow coming out between the interlocking filters ensuring that microbes and harmful organisms are caught by the pleated filter media.

FIG. 6A depicts a bottom view of a second frame 34 before assembly into an interlocking filter created by the method.

A sealing adhesive 99f, 99g, 99h, 99i, and 99j is shown disposed on an inside surface of the second frame 34 to engage pleated filter media.

The sealing adhesive 99f, 99g, 99h, 99i, and 99j prevents the interlocking filter from separating and the pleated filter media from disengaging from the frame.

The sealing adhesive can be used on each of the first and second edges of the pleated filter media to opposing first frame sides to seal the pleated filter media to the opposing first frame sides.

The sealing adhesive can be used on each of the first and second corrugated edges of the pleated filter media to opposing first frame sides which do not engage the first and second edges of the pleated filter media to seal the pleated filter media to the opposing first frame sides which do not engage the first and second edges of the pleated filter media.

The sealing adhesive can be used on each of the first frame sides to secure to each second frame sides.

The sealing adhesive can be used on each of the first frame front panels to bond and seal the pleated filter media to the first frame front panels while simultaneously excluding the one piece non-rigid flexible integral locking mechanism.

The sealing adhesive can be used on each of the second frame front panels to bond and seal to the pleated filter media.

It should be noted that the second frame sides can have adhesive on them to secure respectively to each first frame side.

FIG. 6B depicts a bottom view of a first frame 20 before assembly into an interlocking filter created by the method.

A sealing adhesive 99a, 99b, 99c, 99d, and 99e is shown disposed on an inside surface of the first frame 20 to engage the pleated filter media on a side opposite the second frame.

It should be noted that the first frame sides can have adhesive on each side to securely respectively to each second frame side.

Also shown are tab 50 for engaging slot 64, tab 52 for engaging slot 65, tab 60 for engaging slot 66 and tab 62 for engaging slot 67.

The tabs enable the frames to be constructed and taken apart very quickly in the field. The tabs assist in the quick connect and quick disconnect.

Figure 6C:
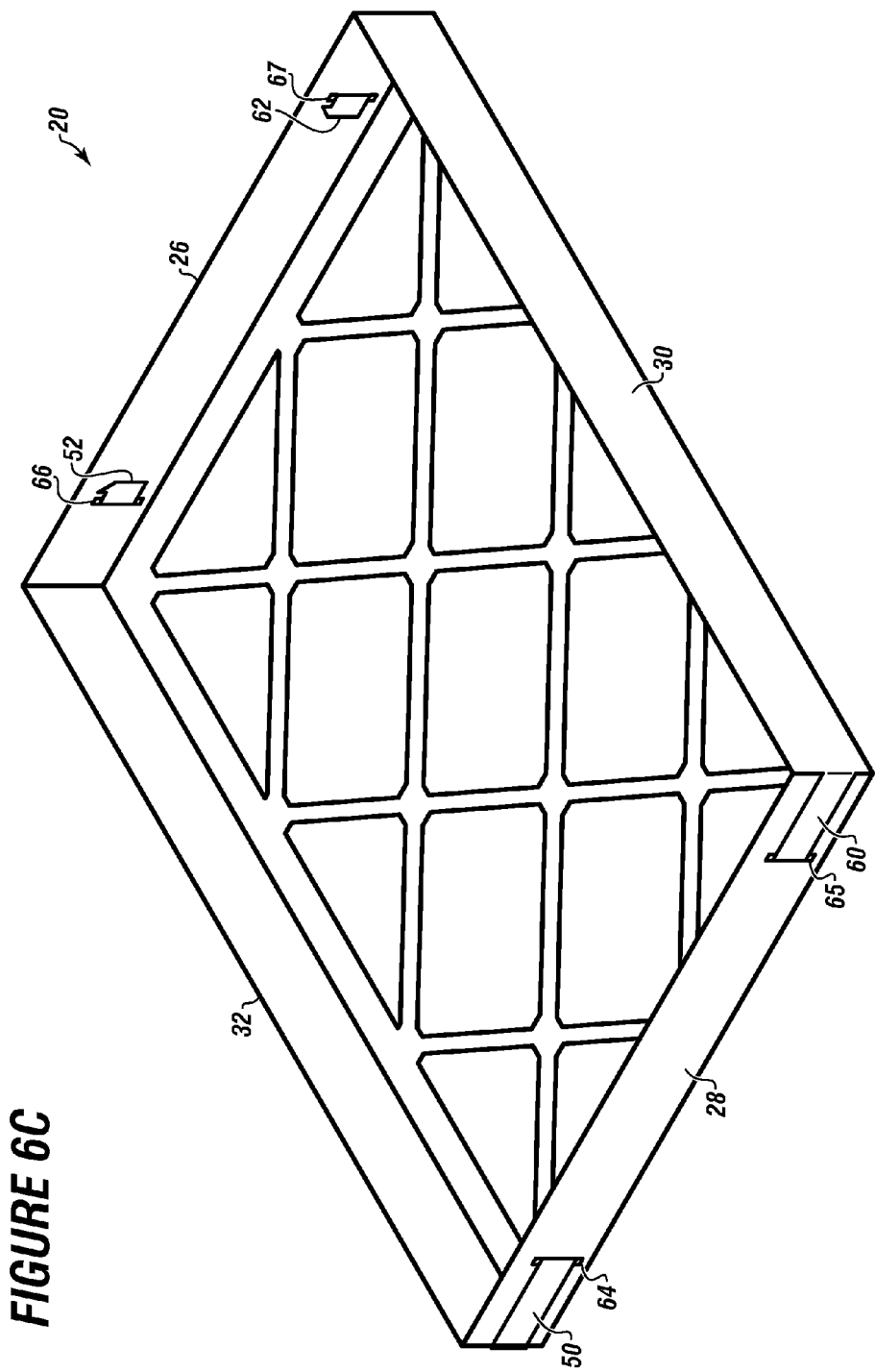
FIG. 6C shows a top view of the first frame as assembled using tabs and slots created by the method.

FIG. 6C shows a top view of the first frame as assembled using tabs and tab slots created by the method.

A first tab 50 is shown on a first end of the first frame fourth side 32, a second tab 52 is shown on a second end of the first frame fourth side 32, a third tab 60 is shown on a first end of the first frame third side 30, and a fourth tab 62 is shown on a second end of the first frame third side 30.

A first slot 64 for engaging the first tab 50 is shown, wherein the first slot 64 is located on the first end of the first frame second side 28.

A second slot 66 for engaging the second tab 52 is shown, wherein the second slot 66 is located on a first end of the first frame first side 26.

A third slot 65 for engaging the third tab 60 is shown, wherein the third slot 65 is located on a second end of the first frame second side 28.

A fourth slot 67 for engaging the fourth tab 62 is shown, wherein the fourth slot 67 is located on a second end of the first frame first side 26.

In embodiments, each slot can engage an adjacent tab to secure one outer side to another outer side of the same frame.

FIGS. 7A-7F show different embodiments of the first and second frame front panels created by the method.

These Figures show different frame front panels having different shapes for support. In embodiments, both the first and second frame front panels can have these shapes.

Each interlocking filter can have a frame wherein the plurality of support members extending from opposing sides of each frame front panel can form a shape that is at least one of: a honeycomb shape shown in FIG. 7A, a triangular shape shown in FIG. 7B, a circular shape shown in FIG. 7C, a rectangular shape shown in FIG. 7D, a shape of a circle with radial arms shown in FIG. 7E, and an "X" shape shown in FIG. 7F.

In embodiments, additional shapes can be used, such as a diamond shape shown in FIG. 2 and a square shape shown in FIGS. 6A and 6B.

In embodiments of the method, the plurality of support members can be identical in shape.

In embodiments of the method, the plurality of support members can form a logo for a company.

Figure 8B:
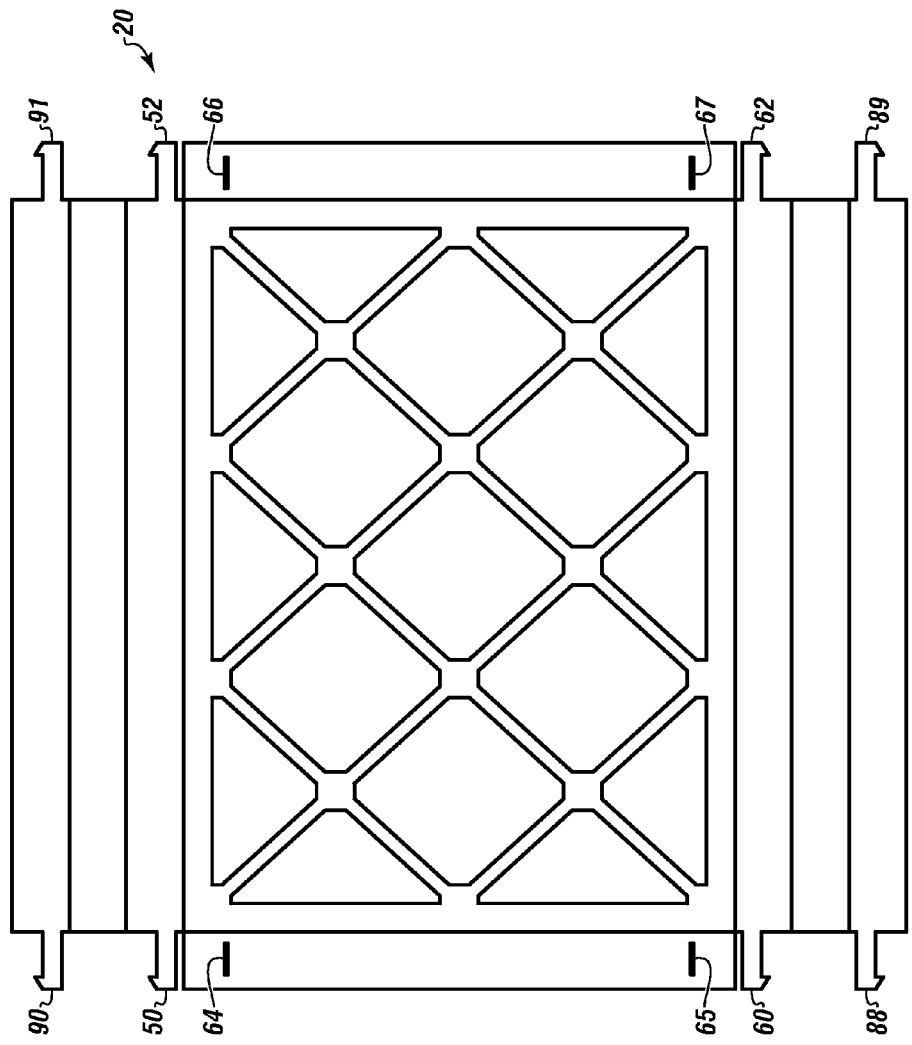

FIGS. 8A and 8B show an interlocking filter with a locking pocket created by the method.

The interlocking filter 100 with the first frame 20 is shown.

The one piece non-rigid flexible integral locking mechanism is shown in this Figure with a pair of tabs 60, 62 and a pair of wings 88 and 89 on a portion opposite the pair of tabs, wherein the tabs and wings engage the same slot forming a locking pocket 600 into which the one piece non-rigid flexible integral locking mechanism of an adjacent filter can be installed.

Tab 60 and wing 88 can engage slot 65, tab 62 and wing 89 can engage slot 67, tab 50 and wing 90 can engage slot 64 and tab 52 and wing 91 can engage slot 66 respectively.

FIG. 9 depict the steps of the method according to one or more embodiments.

The method can include pleating a filter media, depicted as step 900.

The method can include creating a first frame, depicted as step 902.

In this step of the method, the first frame is cut to have a first frame first side, a first frame second side, a first frame third side, and a fourth frame fourth side.

The method can include laying the first frame flat, adhering the pleated filter media to the first frame first side and the first frame second side, and adhering the corrugated edges of the pleated filter media to the first frame third side and the first frame fourth side, depicted as step 904.

The method can include creating a second frame, depicted as step 906.

In this step of the method, the second frame is cut to have a non-adhesive projection portion of the one piece non-ridge flexible integral locking mechanism that extends outwardly from the second frame front panel as a unitary structure.

The method can include applying an adhesive to the sides of the first frame to connect the sides of the second frame with the sides of the first frame, depicted here as 908.

The method can include applying an adhesive to the pleated filter media within the first frame front panel and the second frame front panel to hold the pleated filter media within the first frame, depicted as step 910.

The method can include forming tabs and slots and using the tabs to engage the slots to hold the second frame around the first frame forming at least one interlocking filter, depicted as step 912.

The method can include using the now formed interlocking filter to interlock the non-adhesive single projection portion or a non-adhesive double projection portion from a second frame front panel of a first interlocking filter to another interlocking filter to engage a non-adhesive single projection portion or a non-adhesive double projection portion from a second frame front panel of the one piece non-rigid flexible integral locking mechanism of a second interlocking filter, depicted as step 914.

The method can include forming a "J" shape in the tight engagement between the interlocking filters, providing a secure filtration system resistant to impact, resistant to coming apart when HVAC systems start up, blowing air at a higher velocity than when running, depicted as step 916.

Creating the "J" shape engagement also provides a tight flush rigid mechanical fit between the frames of the two connected filters keeping the frames side by side in a rigid engagement with a space between the filters of less than 0.25 inches.

The method can include forming an air tight connection and filtering at least 95 percent of the air passing through the first interlocking filter while simultaneously creating the non-deforming particulate filtration bank of the plurality of interlocking filters without clamps or adhesive to hold the interlocking filters to each other, depicted as step 918.

This method creates a non-deforming particulate filtration bank with a plurality of interlocking filters held together without clamps or adhesive yet simultaneously (i) adding strength at the engaged locking mechanisms while (ii) minimizing a separation distance between each frame of each filter to less than 0.25 inches enabling (iii) a single direction of air flow filtration exclusively through the pleated filter media usable for use in medical facilities and other facilities requiring a 95 percent capture rates for airborne contaminates.

In embodiments, the method can include applying the waterproof coating.

In embodiments of the method, the invention can treat the pleated filter media with activated carbon. In addition, the pleated carbon treated filter media can be bonded to an expandable mesh positioned on one side of the pleated carbon treated filter media. The pleated carbon treated filter media can be inserted in the variety of frames with projections as described above.

In embodiments of the method, the invention can treat the pleated filter media with a chemically reactive antimicrobial material. In addition, the pleated antimicrobial filter media can have a first edge, a second edge opposite the first edge, a first corrugated edge, and a second corrugated edge opposite the first corrugated edge, and an expandable mesh positioned on one side of the pleated antimicrobial filter media, wherein the expandable mesh can be bonded to the pleated antimicrobial filter media.

In embodiments of the method, the invention can treat pleated filter media used with heating, ventilation, and air conditioning systems with an air intake and intake ducts having a first end and a second end, connected to the air intake for flowing air on the first end.

The method can include an interlocking filtration system can have a plurality of quick connect and quick disconnect interlocking filters, which can be disposed in the air return for conditioning the air.

In an embodiment of the present invention, the one piece non-rigid flexible integral locking mechanism can be integrally formed with the second frame at the time of manufacture For ease of manufacture, each interlocking filter can be formed as a two frame structure with a single projection and the double projection, or portions, extending from the second frame front panel.

While these embodiments have been described with emphasis on the embodiments, it should be understood that within the scope of the appended claims, the embodiments might be practiced other than as specifically described herein.

What is claimed is:

1. A method for filtering air by forming a non-deforming particulate filtration bank for one direction filtration of air formed from a plurality of interlocking filters comprising, wherein the method comprising:
   a. pleating a filter media forming a first edge, a second edge opposite the first edge, a first corrugated edge, and a second corrugated edge opposite the first corrugated edge;
   b. creating a first frame, wherein the first frame comprises:
      (i) a first frame front panel with a plurality of first front support members extending from opposing sides of the first frame front panel;
      (ii) a first frame first side connected to the first frame front panel;
      (iii) a first frame second side opposite the first frame first side connected to the first frame front panel;
      (iv) a first frame third side connected to the first frame front panel and connected between the first frame first side and the first frame second side; and
      (v) a first frame fourth side connected to the first frame front panel and connected between the first frame first side and the first frame second side;
   c. creating a second frame, wherein the second frame comprises:
      (i) a second frame front panel with a plurality of second front support members extending from opposing sides of the second frame front panel;
      (ii) a second frame first side connected to the second frame front panel;
      (iii) a second frame second side opposite the second frame first side and connected to the second frame front panel;
      (iv) a one piece non-rigid flexible integral locking mechanism connected to the second frame front panel disposed between the second frame first side and the second frame second side, wherein a portion of the one piece non-rigid flexible integral locking mechanism extends outwardly from the second frame front panel; and
      (v) a second frame third side opposite the one piece non-rigid flexible integral locking mechanism connected to the second frame front panel connected between the second frame first side and the second frame second side;
   d. disposing a sealing adhesive on:
      (i) each of the first and the second edges of the pleated filter media to the opposing first frame sides to seal the pleated filter media to the opposing first frame sides;
      (ii) each of the first and the second corrugated edges of the pleated filter media to the opposing first frame sides which do not engage the first and the second edges of the pleated filter media to seal the pleated filter media to the opposing first frame sides which do not engage the first and the second edges of the pleated filter media;
      (iii) each of the first frame sides to secure to each of the second frame sides;
      (iv) each of the first frame front panels to bond and seal the pleated filter media to the first frame front panels while simultaneously excluding the one piece non-rigid flexible integral locking mechanism; and
      (v) each of the second frame front panels to bond and seal to the pleated filter media;
   e. interlocking a non-adhesive single projection portion or a non-adhesive double projection portion from a second frame front panel of a first interlocking filter engaging a non-adhesive single projection portion or a non-adhesive double projection portion from a second frame front panel of the one piece non-rigid flexible integral locking mechanism of a second interlocking filter;
   f. forming an air tight connection and filtering at least 95 percent of the air passing through the first interlocking filter while simultaneously creating the non-deforming particulate filtration bank of the plurality of interlocking filters without clamps or adhesive to hold the interlocking filters to each other; and
   g. installing a pair of tabs on ends of each non-adhesive projection portion adjacent the second frame front panel, and then a pair of wings on ends of the non-adhesive projection portion opposite the pair of tabs, wherein each wing and each tab on the same side engage an identical slot forming a locking pocket into which the one piece non-rigid flexible integral locking mechanism of an adjacent filter can be installed.

2. The method of claim 1, adding tabs and slots to the second frame comprising:
   a. a first tab on a first end of the first frame fourth side;
   b. a second tab on a second end of the first frame fourth side;
   c. a third tab on a first end of the first frame third side;
   d. a fourth tab on a second end of the first frame third side;
   e. a first slot for engaging the first tab, wherein the first slot is on a first end of the first frame second side;
   f. a second slot for engaging the second tab, wherein the second slot is on a first end of the first frame first side;
   g. a third slot for engaging the third tab, wherein the third slot is on a second end of the first frame second side; and
   h. a fourth slot for engaging the fourth tab, the fourth tab slot is on a second end of the first frame first side, wherein each slot engages an adjacent tab to secure one outer side to another outer side of the same frame.

3. The method of claim 1, further comprising using interlocking filters with identical sizes.

4. The method of claim 1, further comprising using a one piece media as the pleated filter media.

5. The method of claim 1, further comprising applying a waterproof coating to the first frame, the second frame, or both the first and the second frames.

6. The method of claim 1, further comprising using from 1 pleat per foot to 500 pleats per foot in the pleated filter media.

7. The method of claim 1, further comprising using an electrostatic filter media that is made of synthetic or cotton blend as the pleated filter media.

8. The method of claim 1, further comprising using a heat treated media as the pleated filter media.

9. The method of claim 1, further comprising bonding an expandable mesh on one side of the pleated filter media.

10. The method of claim 9, further comprising using as the expandable mesh at least one of:
 a. aluminum;
 b. welded metal wire; and
 c. semi-rigid polymer webbing.

11. The method of claim 9, wherein the expandable mesh is laminated to the pleated filter media with an adhesive.

12. The method of claim 1, further comprising using a shape for the plurality of support members that extend from opposing side of each frame front panel that is at least one of:
 a. a honeycomb shape;
 b. a triangular shape;
 c. a rectangular shape;
 d. a circular shape;
 e. a shape of a circle with radial arms,
 f. a diamond shape, and
 g. a square shape.

13. The method of claim 12, further comprising using identical shapes for the plurality of support members.

14. The method of claim 1, further comprising forming a pocket on one side of the second frame allowing engagement of a non-adhesive projection portion of an adjacent interlocking frame into the pocket.

15. The method of claim 1, further comprising using a pair of tabs on each non-adhesive projection portion of each interlocking frame to engage slots on adjoining sides of the frame.

16. The method of claim 1, further comprising installing at least one locking button for compressibly connecting the non-adhesive double projection portion to a non-adhesive single projection portion or a connecting a non-adhesive single projection portion to another non-adhesive single projection portion or connecting a non-adhesive double projection portion to another non-adhesive double projection portion.

17. The method of claim 1, further comprising applying a chemically reactive antimicrobial material disposed on the pleated filter media.

18. The method of claim 1, further comprising applying an activated carbon on the pleated filter media.

19. A method for filtering air by forming a non-deforming particulate filtration bank for one direction filtration of air formed from a plurality of interlocking filters comprising, wherein the method comprising:
 a. pleating a filter media forming a first edge, a second edge opposite the first edge, a first corrugated edge, and a second corrugated edge opposite the first corrugated edge;
 b. creating a first frame, wherein the first frame comprises:
  (i) a first frame front panel with a plurality of first front support members extending from opposing sides of the first frame front panel;
  (ii) a first frame first side connected to the first frame front panel;
  (iii) a first frame second side opposite the first frame first side connected to the first frame front panel;
  (iv) a first frame third side connected to the first frame front panel and connected between the first frame first side and the first frame second side; and
  (v) a first frame fourth side connected to the first frame front panel and connected between the first frame first side and the first frame second side;
 c. creating a second frame, wherein the second frame comprises:
  (i) a second frame front panel with a plurality of second front support members extending from opposing sides of the second frame front panel;
  (ii) a second frame first side connected to the second frame front panel;
  (iii) a second frame second side opposite the second frame first side and connected to the second frame front panel;
  (iv) a one piece non-rigid flexible integral locking mechanism connected to the second frame front panel disposed between the second frame first side and the second frame second side, wherein a portion of the one piece non-rigid flexible integral locking mechanism extends outwardly from the second frame front panel; and
  (v) a second frame third side opposite the one piece non-rigid flexible integral locking mechanism connected to the second frame front panel connected between the second frame first side and the second frame second side;
 d. adding tabs and slots to the second frame comprising:
  (i) a first tab on a first end of the first frame fourth side;
  (ii) a second tab on a second end of the first frame fourth side;
  (iii) a third tab on a first end of the first frame third side;
  (iv) a fourth tab on a second end of the first frame third side;
  (v) a first slot for engaging the first tab, wherein the first slot is on a first end of the first frame second side;
  (vi) a second slot for engaging the second tab, wherein the second slot is on a first end of the first frame first side;
  (vii) a third slot for engaging the third tab, wherein the third slot is on a second end of the first frame second side; and
  (viii) a fourth slot for engaging the fourth tab, the fourth tab slot is on a second end of the first frame first side, wherein each slot engages an adjacent tab to secure one outer side to another outer side of the same frame;
 e. disposing a sealing adhesive on:
  (i) each of the first and the second edges of the pleated filter media to the opposing first frame sides to seal the pleated filter media to the opposing first frame sides;
  (ii) each of the first and the second corrugated edges of the pleated filter media to the opposing first frame sides which do not engage the first and the second edges of the pleated filter media to seal the pleated filter media to the opposing first frame sides which do not engage the first and the second edges of the pleated filter media;
  (iii) each of the first frame sides to secure to each of the second frame sides;
  (iv) each of the first frame front panels to bond and seal the pleated filter media to the first frame front panels while simultaneously excluding the one piece non-rigid flexible integral locking mechanism; and
  (v) each of the second frame front panels to bond and seal to the pleated filter media;
 f. interlocking a non-adhesive single projection portion or a non-adhesive double projection portion from a second frame front panel of a first interlocking filter engaging a non-adhesive single projection portion or a non-adhesive double projection portion from a second frame front panel of the one piece non-rigid flexible integral locking mechanism of a second interlocking filter; and g. forming an air tight connection and filtering at least 95 percent of the air passing through the first interlocking filter while simultaneously creating the non-deforming particulate filtration bank of the plurality of interlocking filters without clamps or adhesive to hold the interlocking filters to each other.

20. A method for filtering air by forming a non-deforming particulate filtration bank for one direction filtration of air formed from a plurality of interlocking filters comprising, wherein the method comprising:

a. pleating a filter media forming a first edge, a second edge opposite the first edge, a first corrugated edge, and a second corrugated edge opposite the first corrugated edge;

b. creating a first frame, wherein the first frame comprises:
   (i) a first frame front panel with a plurality of first front support members extending from opposing sides of the first frame front panel;
   (ii) a first frame first side connected to the first frame front panel;
   (iii) a first frame second side opposite the first frame first side connected to the first frame front panel;
   (iv) a first frame third side connected to the first frame front panel and connected between the first frame first side and the first frame second side; and
   (v) a first frame fourth side connected to the first frame front panel and connected between the first frame first side and the first frame second side;

c. creating a second frame, wherein the second frame comprises:
   (i) a second frame front panel with a plurality of second front support members extending from opposing sides of the second frame front panel;
   (ii) a second frame first side connected to the second frame front panel;
   (iii) a second frame second side opposite the second frame first side and connected to the second frame front panel;
   (iv) a one piece non-rigid flexible integral locking mechanism connected to the second frame front panel disposed between the second frame first side and the second frame second side, wherein a portion of the one piece non-rigid flexible integral locking mechanism extends outwardly from the second frame front panel; and
   (v) a second frame third side opposite the one piece non-rigid flexible integral locking mechanism connected to the second frame front panel connected between the second frame first side and the second frame second side;

d. disposing a sealing adhesive on:
   (i) each of the first and the second edges of the pleated filter media to the opposing first frame sides to seal the pleated filter media to the opposing first frame sides;
   (ii) each of the first and the second corrugated edges of the pleated filter media to the opposing first frame sides which do not engage the first and the second edges of the pleated filter media to seal the pleated filter media to the opposing first frame sides which do not engage the first and the second edges of the pleated filter media;
   (iii) each of the first frame sides to secure to each of the second frame sides;
   (iv) each of the first frame front panels to bond and seal the pleated filter media to the first frame front panels while simultaneously excluding the one piece non-rigid flexible integral locking mechanism; and
   (v) each of the second frame front panels to bond and seal to the pleated filter media;

e. interlocking a non-adhesive single projection portion or a non-adhesive double projection portion from a second frame front panel of a first interlocking filter engaging a non-adhesive single projection portion or a non-adhesive double projection portion from a second frame front panel of the one piece non-rigid flexible integral locking mechanism of a second interlocking filter;

f. forming an air tight connection and filtering at least 95 percent of the air passing through the first interlocking filter while simultaneously creating the non-deforming particulate filtration bank of the plurality of interlocking filters without clamps or adhesive to hold the interlocking filters to each other; and g. using a pair of tabs on each non-adhesive projection portion of each interlocking frame to engage slots on adjoining sides of the frame.

* * * * *